United States Patent [19]
Suzuki et al.

[11] Patent Number: 5,510,412
[45] Date of Patent: Apr. 23, 1996

[54] RESINOUS SOFT MAGNETIC COMPOSITION

[75] Inventors: Keiichiro Suzuki; Masahito Tada, both of Iwaki, Japan

[73] Assignee: Kureha Kagaku Kogyo Kabushiki Kaisha, Tokyo, Japan

[21] Appl. No.: 199,706

[22] Filed: Feb. 22, 1994

[30]  Foreign Application Priority Data

Feb. 26, 1993  [JP]  Japan .................................... 5-062757
Aug. 31, 1993  [JP]  Japan .................................... 5-237130

[51] Int. Cl.$^6$ ............................... C08J 5/10; C08K 3/08; C08L 81/04
[52] U.S. Cl. ..................... 524/440; 524/430; 524/431; 524/432; 524/435; 525/189
[58] Field of Search ................................ 524/430, 431, 524/432, 435, 440; 525/189

[56]  References Cited

U.S. PATENT DOCUMENTS 4,134,874  1/1979  Needham ........................... 260/37 SB

FOREIGN PATENT DOCUMENTS 61-285256  12/1986  Japan .

*Primary Examiner*—Paul R. Michl
*Assistant Examiner*—U. K. Rajguru
*Attorney, Agent, or Firm*—Wenderoth, Lind & Ponack

[57]  ABSTRACT

A resinous soft magnetic composition is constituted by (a) 80–95 wt. % of a powdery soft magnetic material, and (b) 5–20 wt. % of a resin component comprising (1) 70–99.5 wt. % of a polyarylene sulfide resin, and (2) 0.5–30 wt. % of an ultrahigh-molecular weight polyethylene having a weight-average molecular weight of from about $4\times10^5$ to about $7\times10^6$. Because of the inclusion of the ultrahigh-molecular weight polyethylene, the magnetic composition is provided with an improved melt-flowability suitable for injection molding while retaining a sufficient soldering heat-resistance as represented by a freeness of a molded product thereof from cracking after dipping in a solder bath at about 260° C. for 10 sec.

10 Claims, No Drawings

RESINOUS SOFT MAGNETIC COMPOSITION

FIELD OF THE INVENTION AND RELATED ART

The present invention relates to a resinous soft magnetic composition excellent in melt-flowability required for molding and in heat resistance required for soldering (soldering heat-resistance).

A resinous permeable magnetic composition comprising a soft magnetic powder and a polyarylene sulfide resin as a binder resin therefor, is known. For example, Japanese Laid-Open Patent Application (JP-A) 55-103705 discloses a permeable ferrite-based magnetic composition comprising 92–99 wt. % of spinel ferrite particles and 8–1 wt. % of polyphenylene sulfide. However, such a composition comprising a polyarylene sulfide resin and a soft magnetic powder dispersed therein is caused to have an extremely poor melt-flowability to make the injection molding thereof difficult, especially when the soft magnetic powder content is increased. For instance, the melt viscosity of a polyarylene sulfide resin can be remarkably increased from about 10 Pa.s in its magnetic powder-free state to about 1000 Pa.s when a soft magnetic material is added thereto.

U.S. Pat. No. 4,134,874 (corr. to JP-A 54-47752) discloses a method for improving processability of a polyarylene sulfide resin by addition of polyethylene thereto. However, when such a polyarylene sulfide resin composition having an improved processability by addition of polyethylene is used as a matrix or binder resin for providing a resinous soft magnetic composition, it has been discovered that the resultant magnetic composition has a poor heat resistance. For example, a molded product of the magnetic composition, when dipped in a solder bath at a temperature of about 260° C. for about 10 sec and then taken out, is liable to crack.

SUMMARY OF THE INVENTION

It is an object of the present invention to provide a resinous soft magnetic composition comprising a polyarylene sulfide resin as a principal binder resin, yet having an improved melt-flowability suitable for injection molding as well as an excellent heat resistance suitable for soldering so as to be free from cracking after being dipped for about 10 sec. in and then taken out of a solder bath at a temperature of about 260° C.

As a result of our study, the poor heat resistance of the polyarylene sulfide resin composition provided with an improved processability by addition of polyethylene when used as a binder resin for a soft magnetic composition has been found attributable to a low heat resistance of the polyethylene added having a low molecular weight as represented by a melt index on the order of 30 (corr. to a weight-average molecular weight on the order of $3.5 \times 10^4$ according to ASTM D4020). According to our further study, however, it has been discovered that, if polyethylene having an extremely increased molecular weight, i.e., an ultrahigh-molecular weight polyethylene, is used instead of ordinary polyethylene and mixed with a polyarylene sulfide resin and a predominant amount of soft magnetic powder, the resultant resinous soft magnetic composition can be provided with a remarkably improved melt-flowability suitable for injection molding while retaining an appropriate level of heat resistance suitable for soldering.

According to the present invention based on the above discovery, there is provided a resinous soft magnetic composition, comprising:

(a) 80–95 wt. % of a powdery soft magnetic material, and
(b) 5–20 wt. % of a resin component comprising
 (1) 70–99.5 wt. % of a polyarylene sulfide resin, and
 (2) 0.5–30 wt. % of an ultrahigh-molecular weight polyethylene having a weight-average molecular weight of from about $4 \times 10^5$ to about $7 \times 10^6$.

Incidentally, there has been also known a polyarylene sulfide resin composition having an improved lubricity by addition of an ultrahigh-molecular weight polyethylene (JP-A 61-285256). However, the composition comprises a predominant amount of the polyarylene sulfide resin, and it has not been suggested that a combination of polyarylene sulfide resin and an ultrahigh-molecular weight polyethylene functions as an excellent binder resin in a soft magnetic composition predominantly comprising a powdery soft magnetic material to provide an improved melt-flowability suitable for molding injection and an excellent soldering heat-resistance.

The above mentioned and other objects and features of the invention will be better understood upon consideration of the following detailed description concluding with evaluation based on Examples and Comparative Examples.

DETAILED DESCRIPTION OF THE INVENTION

The soft magnetic composition according to the present invention comprises 5–20 wt. %, preferably 7–15 wt. %, of a resin component (composition) and 80–95 wt. %, preferably 85–93 wt. %, of a powdery soft magnetic material (soft magnetic powder). If the resin component is below 5 wt. %, it is difficult to obtain a magnetic composition having a sufficient melt-flowability. On the other hand, if the resin component exceeds 20 wt. %, it is difficult to obtain a molded product of the magnetic composition showing a sufficiently high permeability.

The resin component used in the present invention includes 70–99.5 wt. %, preferably 80–99 wt. %, more preferably 85–98 wt. %, of a polyarylene sulfide resin, and 0.5–30 wt. %, preferably 1–20 wt. %, more preferably 2–15 wt. % of ultrahigh-molecular weight polyethylene. If the polyarylene sulfide resin is below 70 wt. % of the resin component, the resultant magnetic composition cannot satisfy a required soldering heat-resistance and, if the polyarylene sulfide resin exceeds 99.5 wt. %, the intended improvement in melt-flowability is not sufficiently attained. On the other hand, if the ultrahigh-molecular weight polyethylene is below 0.5 wt. % of the resin component, it is difficult to obtain a magnetic composition showing excellent melt-flowability and molding characteristic. In excess of 30 wt. %, the soldering heat-resistance is impaired.

Herein, the polyarylene sulfide resin refers to a polymer comprising at least 50 wt. %, preferably at least 70 wt. %, more preferably at least 90 wt. %, of a recurring unit represented by ―(Ar―S)―, wherein ―Ar― denotes an arylene group. It is particularly preferred to use a polyarylene sulfide having a substantially linear structure formed from a monomer (or monomer mixture) comprising a bi-functional monomer because of an excellent toughness. It is however possible to use a polyarylene-sulfide having a partially crosslinked structure or subjected to curing for increasing the melt viscosity as far as the mechanical properties are not impaired thereby. A preferred example of the recurring unit ―(Ar―S)― is a p-phenylene sulfide unit.

The polyarylene sulfide may be a homopolymer, a random copolymer or a block copolymer. The copolymer may preferably comprise at least 50 wt. %, particularly at least 60 wt. %, of the p-phenylene sulfide having the structure shown above and at most 50 wt. %, particularly at most 40 wt. %, of another $-(Ar-S)-$ unit.

The polyarylene sulfide resin may preferably have an apparent melt viscosity of 0.5–120 Pa.s, more preferably 1–100 Pa.s, further preferably 1.5–80 Pa.s, as measured at a temperature of 310° C. and a shear rate of 1200 sec$^{-1}$ by using a capillary viscometer. If the apparent melt viscosity of the polyarylene sulfide resin is below 0.5 Pa.s, the magnetic composition is liable to provide a molded product having an extremely low mechanical strength. On the other hand, in excess of 120 Pa.s, the molding characteristic of the magnetic composition can be impaired.

The ultrahigh-molecular weight polyethylene used in the present invention has a weight-average molecular weight of $4 \times 10^5 - 7 \times 10^6$, preferably $4.5 \times 10^5 - 5 \times 10^6$, further preferably $5 \times 10^5 - 4 \times 10^6$, as measured according to ASTM D4020. If the molecular weight is below $4 \times 10^5$, the magnetic composition is liable to provide a molded product having a rough surface. If the molecular weight exceeds $7 \times 10^6$, the magnetic composition is caused to have a low melt-viscosity.

Further, the ultrahigh-molecular weight polyethylene may preferably be served in the form of fine particles having an average particle size of at most 1 mm, more preferably at most 0.5 mm, as measured by using a Coulter counter when used to formulate the magnetic composition according to the present invention.

The resin component used in the magnetic composition according to the present invention can further contain another resin in addition to the polyarylene sulfide resin and the ultrahigh-molecular weight polyethylene. Examples of such another resin may include: thermoplastic resins and modified products thereof, such as polyamide, polyether ether ketone, polyethylene terephthalate, polybutylene terephthalate, totally aromatic polyester, polyoxymethylene, polyoxyethylene, polystyrene, polycarbonate, polyethersulfone, polysulfone, polyphenylene ether, polyarylate, polyether imide, polyamidemide and polymethylpentene; epoxy resin, and silicone resin. The amount of such another resin should be suppressed so that the total amount of the polyarylene sulfide and the ultrahigh molecular weight-polyethylene occupies at least 70.5 wt. % of the resin component.

The soft magnetic powder used in the present invention is powder of a magnetic material having a coercive force of preferably at most 100 kA/m. Preferred examples of such a magnetic material may include: spinel structure-ferrite, garnet structure-ferrite, maghemite, chromite, Permalloy, Sendust, metal-metalloid-type amorphous alloy, metal-metal-type amorphous alloy and pure iron-based alloy. Among these, preferred examples of the spinel structure-ferrite may include: Mn—Zn-based ferrite, Ni—Zn-based ferrite, Ni—Zn—Cu-based-ferrite, Mg—Zn-based ferrite, Cu—Zn-based ferrite, Li—Zn-based ferrite, Ni—Cu—Co—based ferrite and other ferrites represented by $MO.Fe_2O_3$ (wherein M denotes a divalent metal such as Mn, Fe, Co, Ni and Mg). As other preferred examples, the garnet structure-ferrite may be one principally comprising $R_3Fe_5O_{12}$ (R: rare earth element), the Permalloy may be Fe—Ni alloy containing 70–80 wt. % of Ni, and the pure iron-based alloy may be iron carbonyl.

Two or more species of the soft magnetic powder can be used in combination as desired. The soft magnetic powder can be surface-treated, as desired, with a known surface-treating agent, such as a silane coupling agent, a titanate coupling agent, an aluminum coupling agent, or a phosphorus-based coupling agent.

The soft magnetic powder may preferably have an average particle size of 1–200 μm, more preferably 3–150 μm, as measured by the light scattering method (e.g., by using a light-scattering photometer "LA-500", available from Horiba Seisakusho K.K.). If the average particle size is below 1 μm, the melt-flowability of the magnetic composition is liable to be lowered and, in excess of 200 μm, the dispersion of the resin component and the magnetic powder is liable to be ununiform at the time of molding of the composition.

In addition to the above-described components, the magnetic composition according to the present invention can further contain a third or optional ingredient. Examples thereof may include: processing aids, such as a lubricant and an antioxidant, and fibers, such as carbon fiber and glass fiber.

So as to retain the basic properties of the soft magnetic composition according to the present invention, it is preferred that the total amount of the soft magnetic powder, the polyarylene sulfide resin and the ultrahigh-molecular weight polyethylene occupies at least 85 wt. %, more preferably at least 95 wt. %, further preferably at least 97 wt. % of the composition.

The magnetic composition according to the present invention may be formed as a powdery blend of the component or more preferably be served in the form of pellets on the like as a commercially available form through a known method, such as melt-kneading.

The molding or shaping method applicable to the composition is basically not particularly limited but may preferably be one of applying a high pressure, such as injection molding or compression molding. In view of the excellent melt-flowability of the composition according to the present invention, the injection molding is most suitable. For example, the injection molding may preferably be performed while applying a pressure of 400–3000 kgf/cm$^2$, more preferably 500–2000 kgf/cm$^2$ at a temperature which may be 15°–100° C. higher than the melting point of the polyarylene sulfide resin.

The soft magnetic composition according to the present invention may suitably be used for production of, e.g., magnetic components, suitable for use as or use in coil and core, inductor, rotary transformer, noise filter, delay line, balun requiring a high permeability and electrical insulation, and other electrical or electronical components utilizing electromagnetic induction.

[EXAMPLES]

Evaluation of compositions prepared in Examples and Comparative Examples was performed in the following manner.

[Apparent melt-viscosity]

A composition in the form of pellets (ca. 3 mm in diameter×ca. 3 mm in length) in each Example was placed in a sample holder of a capillary viscometer ("Capillograph", available from Toyo Seiki K.K.), held at 330° C. for 5 min. and then extruded through a capillary of 1 mm in diameter and 10 mm in length at a shear rate of 1000/sec to measure an apparent melt-viscosity of the composition.

[Soldering heat-resistance]

A pellet-form composition in each Example was supplied to an injection molding machine ("IS-75", available from Toshiba Kikai K.K.) and molded under the conditions of a cylinder temperature of 340° C., a nozzle temperature of 340° C., an injection pressure of 150 MPa and a mold temperature of 160° C. to form a molded product having sizes of 3 mm in thickness, 10 mm in width and 130 mm in length, which was further cut into test pieces having a length of about 30 mm. The test pieces were dipped for 10 sec. in a solder bath held at about 260° C. After taking out of the solder bath, the shape and appearance of the test pieces were evaluated by observation with eyes.

[Weight-average molecular weight of polyethylene]

Measured according to ASTM D4020.

Example 1

1.425 kg (corr. to 95 wt. % of resin) of polyphenylene sulfide resin (having an apparent melt-viscosity ($\zeta$a) of about 20 Pa.s at a shear rate of 1200 sec$^{-1}$ and 310° C.; available from Kureha Kagaku Koryo K.K.), 75 g (corr. to 5 wt. % of resin) of a ultrahigh-molecular weight polyethylene (having a weight-average molecular weight (Mw) of about $5\times10^5$ and a density (d) of 0.954 g/cm$^3$; "Hi-Zex Million 030S", available from Mitsui Sekiyu Kagaku Kogyo K.K.), and 13.5 kg of Ni—Zn—Cu ferrite (Dav(average diameter): about 10 μm) were respectively weighed and blended in a Henschel mixer. Thus, the resultant composition in the form of a powder blend contained 10 wt. % of the resin component and 90 wt. % of the ferrite powder. The powder blend was supplied to a 45 mm-dia. twin-screw extruder and melt-kneaded therethrough to provide a composition in the form of pellets.

The resultant composition showed an apparent melt-viscosity ($\zeta$a) of 1060 Pa.s. As a result of examination of the soldering heat-resistance, the test piece showed no abnormality with respect to any of crack and unevenness on the surface and rounding of the corners.

The principal features of the above composition and the results of evaluation are summarized in Table 1 appearing hereinafter together with those of other Examples and Comparative Examples.

Example 2

Example 1 was repeated except that the resin component was changed to one including 91 wt. % (1.365 kg) of the polyphenylene sulfide and 9 wt. % (135 g) of the ultrahigh-molecular weight polyethylene.

The resultant composition showed an apparent melt-viscosity of 930 Pa.s. As a result of examination of the soldering heat-resistance, the test piece showed no abnormality with respect to any of crack and unevenness on the surface and rounding of the corners.

Example 3

Example 1 was repeated except that the resin component was changed to one including 80 wt. % (1.2 kg) of the polyphenylene sulfide and 20 wt. % (300 g) of the ultrahigh-molecular weight polyethylene.

The resultant composition showed an apparent melt-viscosity of 930 Pa.s. As a result of examination of the soldering heat-resistance, the test piece showed no abnormality with respect to any of crack and unevenness on the surface and rounding of the corners.

Example 4

Example 1 was repeated except that the resin component was changed to one including 90 wt. % (1.35 kg) of the polyphenylene sulfide and 10 wt. % (150 g) of a ultrahigh-molecular weight polyethylene (Mw=10$^6$, d=0.942 g/cm$^3$, Dav.=170 μm; "Hi-Zex Million 145M", available from Mitsui Sekiyu Kagaku Kogyo K.K.).

The resultant composition showed an apparent melt-viscosity of 950 Pa.s. As a result of examination of the soldering heat-resistance, the test piece showed no abnormality with respect to any of crack and unevenness on the surface and rounding of the corners.

Example 5

Example 1 was repeated except that the composition was changed to include 15 wt. % of a resin component including 90 wt. % (2.025 kg) of a polyphenylene sulfide resin ($\zeta$a=30 Pa.s) and 10 wt. % (225 g) of the ultrahigh-molecular weight polyethylene, and 85 wt. % (12.75 kg) of Mn—Zn ferrite (Dav=3 μm).

The resultant composition showed an apparent melt-viscosity of 490 Pa.s. As a result of examination of the soldering heat-resistance, the test piece showed no abnormality with respect to any of crack and unevenness on the surface and rounding of the corners.

Example 6

Example 4 was repeated except that the ultrahigh-molecular weight polyethylene was changed to an ultrahigh-molecular weight polyethylene (Mw=2.3×10$^6$, d=0.935 g/cm$^2$ and Dav=200 μm; "Hi-Zex Million 240M", available from Mitsui Sekiyu Kagaku Kogyo K.K.).

The resultant composition showed an apparent melt-viscosity of 890 Pa.s. As a result of examination of the soldering heat-resistance, the test piece showed no abnormality with respect to any of crack and unevenness on the surface and rounding of the corners.

Example 7

Example 4 was repeated except that the ultrahigh-molecular weight polyethylene was changed to an ultrahigh-molecular weight polyethylene (Mw=3.3×10$^6$, d=0.945 g/cm$^2$ and Dav=200 μm; "Hi-Zex Million 340M", available from Mitsui Sekiyu Kagaku Kogyo K.K.).

The resultant composition showed an apparent melt-viscosity of 950 Pa.s. As a result of examination of the soldering heat-resistance, the test piece showed no abnormality with respect to any of crack and unevenness on the surface and rounding of the corners.

Comparative Example 1

Example 1 was repeated except that the resin component was changed by increasing the amount of the polyphenylene sulfide to 1.5 kg and by omitting the ultrahigh-molecular weight polyethylene.

The resultant composition showed an apparent melt-viscosity of 1360 Pa.s. As a result of examination of the soldering heat-resistance, the test piece showed no abnormality with respect to any of crack and unevenness on the surface and rounding of the corners.

Comparative Example 2

Example 1 was repeated except that the resin component was changed to one including 60 wt. % (0.9 kg) of the polyphenylene sulfide and 40 wt. % (600 g) of the ultrahigh-molecular weight polyethylene.

The results of the above Examples and Comparative Examples are inclusively summarized in the following Table 1.

TABLE 1

| | Wt. % in resin component | | Wt. % in composition | | Mw of PE*[1] ($\times 10^4$) | Soft magnetic powder*[2] | $\eta_a$ (Pa·s) | | SHR*[3] |
|---|---|---|---|---|---|---|---|---|---|
| | PPS*[1] | PE*[1] | Resin component | Magnetic powder | | | PPS | Composition | |
| Ex. | | | | | | | | | |
| 1 | 95 | 5 | 10 | 90 | 50 | Ni—Zn—Cu | 20 | 1060 | o |
| 2 | 91 | 9 | 10 | 90 | 50 | Ni—Zn—Cu | 20 | 930 | o |
| 3 | 80 | 20 | 10 | 90 | 50 | Ni—Zn—Cu | 20 | 930 | o |
| 4 | 90 | 10 | 10 | 90 | 100 | Ni—Zn—Cu | 20 | 950 | o |
| 5 | 90 | 10 | 15 | 85 | 50 | Mn—Zn | 30 | 490 | o |
| 6 | 90 | 10 | 10 | 90 | 230 | Ni—Zn—Cu | 20 | 890 | o |
| 7 | 90 | 10 | 10 | 90 | 330 | Ni—Zn—Cu | 20 | 950 | o |
| Comp. Ex. | | | | | | | | | |
| 1 | 100 | 0 | 10 | 90 | — | Ni—Zn—Cu | 20 | 1360 | o |
| 2 | 60 | 40 | 10 | 90 | 50 | Ni—Zn—Cu | 20 | 900 | Δ |
| 3 | 90 | 10 | 10 | 90 | 30 | Ni—Zn—Cu | 20 | 825 | x |
| 4 | 65 | 35 | 15 | 85 | 50 | Mn—Zn | 30 | 450 | x |

Note to Table 1
*[1]PPS: polyphenylene sulfide
PE: polyethylene
*[2]Ni—Zn—Cu: Ni—Zn—Cu-based ferrite
Mn—Zn: Mn—Zn-based ferrite
*[3]SHR: soldering heat-resistance. Evaluation standards are as follows:
o: No abnormality
Δ: Partial unevenness, and rounded corners and ridges due to fusion.
x: Practical cracking, and rounded corners and ridges due to fusion.

The resultant composition showed an apparent melt-viscosity of 900 Pa.s. As a result of examination of the soldering heat-resistance, the test piece showed an unevenness at a part on the surface, and also resulted in rounded corners and ridges.

Comparative Example 3

Example 1 was repeated except that the resin component was changed to one including 90 wt. % (1.35 kg) of the polyphenylene sulfide and 10 wt. % (150 g) of a high molecular weight polyethylene (Mw=$3\times10^5$, d=0.956 g/cm$^3$; "Hi-Zex 8200 BP", available from Mitsui Sekiyu Kagaku Kogyo K.K.).

The resultant composition showed an apparent melt-viscosity of 825 Pa.s. As a result of examination of the soldering heat-resistance, the test piece showed cracking at a part of the surface, and also resulted in rounded corners and ridges.

Example 4

Example 1 was repeated except that the resin component was changed to one including 85 wt. % (1.462 kg) of the polyphenylene sulfide and 15 wt. % (788 g) of the ultrahigh-molecular weight polyethylene and constituting totally 15 wt. % of the resultant magnetic composition.

The resultant composition showed an apparent melt-viscosity of 450 Pa.s. As a result of examination of the soldering heat-resistance, the test piece showed cracking at a part of the surface and also resulted in rounded corners and ridges.

As described above, according to the present invention, it has become possible to provide a soft magnetic composition showing an improved melt-flowability suitable for injection molding and yet retaining a sufficient soldering heat-resistance by using a polyarylene sulfide resin as a binder resin together with a relatively small amount of an ultrahigh-molecular weight polyethylene.

What is claimed is:

1. A resinous soft magnetic composition, comprising:
   (a) 80–95 wt. % of a powdery soft magnetic material, and
   (b) 5–20 wt. % of a resin component comprising
      (1) 70–99.5 wt. % of a polyarylene sulfide resin, and
      (2) 0.5–30 wt. % of an ultrahigh-molecular weight polyethylene having a weight-average molecular weight of from about $4\times10^5$ to about $7\times10^6$.

2. A composition according to claim 1, wherein said ultrahigh-molecular weight polyethylene has a weight-average molecular weight of from $4.5\times10^5$ to $5\times10^6$.

3. A composition according to claim 1, wherein said ultrahigh-molecular weight polyethylene has a weight-average molecular weight of from $5\times10^5$ to $4\times10^6$.

4. A composition according to claim 1, wherein said resin component comprises 85–98 wt. % of the polyarylene sulfide resin and 2–15 wt. % of the ultrahigh-molecular weight polyethylene.

5. A composition according to claim 1, wherein said polyarylene sulfide resin comprises polyphenylene sulfide resin.

6. A composition according to claim 1, wherein said powdery soft magnetic material has a coercive force of at most 100 kA/m.

7. A composition according to claim 6, wherein said soft magnetic material comprises a spinel structure-ferrite.

8. A composition according to claim 6, wherein said soft magnetic material comprises Ni—Zn—Cu-based ferrite.

9. A composition according to claim 6, wherein said soft magnetic material comprises Mn—Zn-base ferrite.

10. A composition according to claim 1, comprising (a) 85–93 wt. % of the powdery soft magnetic material and (b) 7–15 wt. % of the resin component.

* * * * *